US008770896B2

(12) United States Patent
Nisikawa

(10) Patent No.: US 8,770,896 B2
(45) Date of Patent: Jul. 8, 2014

(54) REAMER

(75) Inventor: Koji Nisikawa, Iwaki (JP)

(73) Assignee: Tungaloy Corporation, Fukushima (JP)

( * ) Notice: Subject to any disclaimer, the term of this patent is extended or adjusted under 35 U.S.C. 154(b) by 78 days.

(21) Appl. No.: 13/306,505

(22) Filed: Nov. 29, 2011

(65) Prior Publication Data

US 2012/0070243 A1  Mar. 22, 2012

Related U.S. Application Data

(63) Continuation of application No. PCT/JP2010/059152, filed on May 28, 2010.

(30) Foreign Application Priority Data

May 29, 2009 (JP) ................................. 2009-130267

(51) Int. Cl.
  *B23B 51/00* (2006.01)
  *B23D 77/00* (2006.01)
(52) U.S. Cl.
  CPC ............ *B23D 77/00* (2013.01); *B23D 2277/46* (2013.01); *Y10S 408/705* (2013.01)
  USPC .............................. 408/83; 408/199; 408/705
(58) Field of Classification Search
  CPC .... B23B 51/00; B23B 2251/56; B23D 77/00; B23D 2277/46
  USPC ...................................... 408/81–83, 199, 705
  IPC .................................. B23B 51/00; B23D 77/00
  See application file for complete search history.

(56) References Cited

U.S. PATENT DOCUMENTS

| | | | | |
|---|---|---|---|---|
| 3,389,621 A | * | 6/1968 | Wear | 408/83 |
| 3,591,305 A | * | 7/1971 | Aichhorn et al. | 408/161 |
| 3,751,177 A | * | 8/1973 | Faber | 408/200 |
| 3,762,828 A | * | 10/1973 | Faber | 408/83 |
| 4,571,128 A | * | 2/1986 | Ogden | 408/1 R |
| 5,238,335 A | * | 8/1993 | Nomura | 408/59 |

(Continued)

FOREIGN PATENT DOCUMENTS

| | | | |
|---|---|---|---|
| DE | 196 21 813 A1 | 12/1997 | |
| DE | 10351327 A1 * | 6/2005 | B23B 51/04 |

(Continued)

OTHER PUBLICATIONS

International Search Report in PCT/JP2010/059152, dated Aug. 17, 2010.

(Continued)

*Primary Examiner* — Eric A Gates
(74) *Attorney, Agent, or Firm* — Womble Carlyle

(57) ABSTRACT

A reamer has a center axis and includes a single cutting edge, provided for a cutting part that is arranged at a leading end side. The reamer includes three guide pads in the cutting part. The first guide pad is formed so as to project to the side almost opposite that where the single cutting edge is formed. The second guide pad is arranged in one area of areas, along a peripheral face of the cutting part, that are located between the first guide pad and the single cutting edge and that are directed toward sides opposite each other, and the third guide pad is arranged in the other area.

8 Claims, 14 Drawing Sheets

(56) References Cited

U.S. PATENT DOCUMENTS

| | | | | |
|---|---|---|---|---|
| 5,906,458 A | * | 5/1999 | Planche | 408/197 |
| 5,967,707 A | * | 10/1999 | Larson | 408/1 R |
| 6,884,008 B2 | * | 4/2005 | Minshall | 407/113 |

FOREIGN PATENT DOCUMENTS

| | | | | | |
|---|---|---|---|---|---|
| EP | 824050 A1 | * | 2/1998 | | B23D 77/04 |
| FR | 1 331 349 A | | 7/1963 | | |
| JP | 50-132795 | | 10/1975 | | |
| JP | 8-52617 | | 2/1996 | | |
| JP | 08-066825 | | 3/1996 | | |
| JP | 9-11039 | | 1/1997 | | |
| JP | 09155632 A | * | 6/1997 | | B23D 77/00 |
| JP | 10244419 A | * | 9/1998 | | B23D 77/04 |
| JP | 10315022 A | * | 12/1998 | | B23B 51/00 |
| JP | H11-300524 | | 11/1999 | | |
| JP | 2000354912 A | * | 12/2000 | | B23D 77/04 |
| JP | 2001138109 A | * | 5/2001 | | B23B 27/14 |
| JP | 2001138132 A | * | 5/2001 | | B23D 77/00 |
| JP | 2001138133 A | * | 5/2001 | | B23D 77/02 |
| JP | 2001138134 A | * | 5/2001 | | B23D 77/02 |
| JP | 2002046019 A | * | 2/2002 | | B23D 77/02 |
| JP | 2002239836 A | * | 8/2002 | | B23D 77/02 |
| JP | 2002-273621 | | 9/2002 | | |
| JP | 2002 273621 A | | 9/2002 | | |
| JP | 2004-066391 | | 3/2004 | | |
| JP | 2004-338046 | | 12/2004 | | |
| JP | 2005-246528 | | 9/2005 | | |
| JP | 2005-246528 A | | 9/2005 | | |
| JP | 2007044846 A | * | 2/2007 | | |
| SU | 1202763 A1 | | 1/1986 | | |
| SU | 1484489 A1 | | 6/1989 | | |
| WO | WO 2005009657 A2 | * | 2/2005 | | B23B 29/034 |

OTHER PUBLICATIONS

Official Action dated Oct. 14, 2011 issued in counterpart Japanese application No. 2011-516080 (English translation attached).
Official Action dated Jan. 13, 2012 issued in counterpart Japanese application No. 2011-516080 (English translation attached).
Official Action dated Feb. 27, 2013 issued in Chinese counterpart application (No. 201080023711.0)—with translation.
Search Report dated Feb. 27, 2013 issued in Chinese counterpart application (No. 201080023711.0)—with translation.
Zhao et al, "The Parameter Design for the Guiding Block of BTA Rigid Boring Reamer", *Taiyuan Institute of Mechanical Engineering*, Oct. 31, 1992—with translation.
Extended European Search Report dated Oct. 12, 2012 issued in European counterpart application (No. 10780666.3).
International Preliminary Report on Patentability (IPRP) dated Dec. 22, 2011 issued in counterpart PCT application No. PCT/JP2010/059152.
Notice of allowance dated May 29, 2013 issued in Russian counterpart application (No. 2011148421) with translation.

* cited by examiner

REAMER

CROSS-REFERENCE TO RELATED APPLICATIONS

This is a Continuation of International Patent Application No. PCT/JP2010/059152 filed May 28, 2010, which published as WO 2010/0137712A1 on Dec. 2, 2010, and claims priority to Japanese Patent Application No. 2009-130267, filed May 29, 2009. The contents of the aforementioned applications are incorporated by reference in their entirety.

BACKGROUND OF THE INVENTION

1. Field of the Invention

The present invention relates to a reamer, and particularly to a reamer that includes a single cutting edge.

2. Description of the Related Art

Since a reamer that has a single cutting edge is generally subjected to a load in a specific direction during reaming work, it comprises a guide pad to receive such a load in a specific direction. On the basis that the peripheral face of the guide pad contacts the inner face of a machined hole during processing, the reamer is supported relative to the machined hole. Since burnishing occurs due to the guide pad sliding against the hole, the surface roughness of the inner face of the machined hole can be improved. However, for this type of reamer, usually a large area of the peripheral face of the guide pad contacts the inner face of the machined hole, and the friction resistance between the two (burnishing torque) is increased. This would reduce the accuracy of the machining of the inner face of the machined hole.

Japanese Patent Laid-Open No. 2004-66391 discloses a tool having a single cutting edge, devised so as to improve the accuracy for a finish hole. The tool in Japanese Patent Laid-Open No. 2004-66391 includes, in a cutting part, a cutting edge, a single, substantially arc-shaped pad that is arranged to the rear of the cutting edge in the rotational direction, and a chip discharge groove. Further, in the single pad, a plurality of flutes that are longitudinally extended are formed by cutting parts of the arc-shaped face of the pad.

According to the tool of Japanese Patent Laid-Open No. 2004-66391, the single pad is arranged immediately to the rear of the cutting edge, in the rotational direction of the tool, and formed so as to extend within a continuous range. When this tool is employed to perform the reaming of a hole in a workpiece, especially a workpiece having high elasticity, the pad might push the hole radially and outwardly. In a case wherein the pad has enlarged the hole, there is a probability that the obtained inner diameter of the machined hole may be smaller than a desired size. Such enlarging of the hole by the pad would interrupt the reaming work performed using the tool, and deteriorate the accuracy of the machining of the inner face of the machined hole.

SUMMARY OF THE INVENTION

For solving the above described problem, one objective of the present invention is to provide a reamer with which the accuracy of machining of a machined hole can be improved.

One aspect according to the present invention provides a reamer, which has a center axis and includes a single cutting edge, provided for a cutting part that is arranged at a leading end side, comprising: at least three guide pads arranged at a distance from each other around the cutting part; wherein each of the at least three guide pads extends substantially parallel to the center axis; of the at least three guide pads, a first guide pad is formed so as to project to the side almost opposite that where the single cutting edge is formed; a second guide pad of the at least three guide pads is arranged in one area of two areas, along a peripheral face of the cutting part, that are located between the first guide pad and the single cutting edge and that are directed toward sides opposite each other; and a third guide pad of the at least three guide pads is arranged in the other area, different from the one area, of the two areas that are directed toward the sides opposite each other.

Further features of the present invention will become apparent from the following description of exemplary embodiments (with reference to the attached drawings).

DESCRIPTION OF THE EMBODIMENTS

A reamer according to the present invention will now be described based on embodiments. First, a reamer according to a first embodiment will be described.

Figure 1:
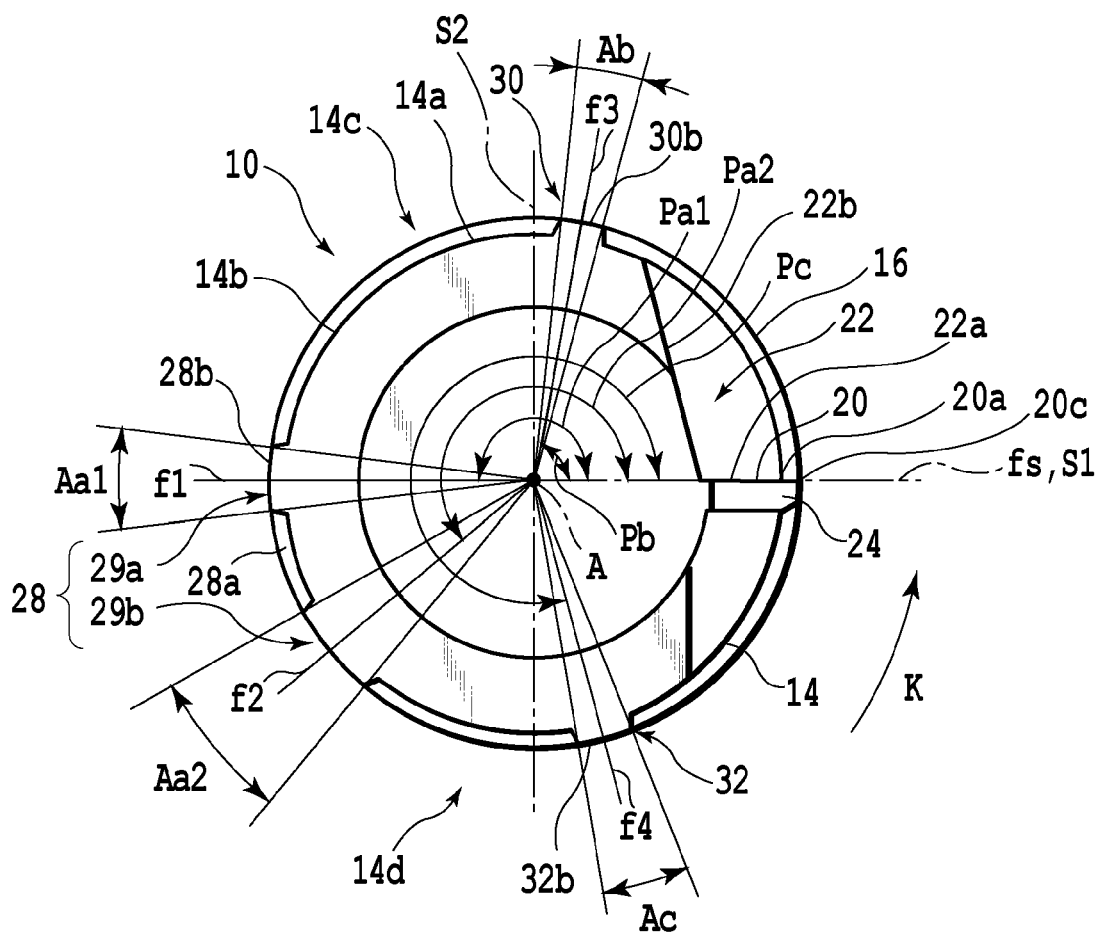
FIG. 1 is a front view of a reamer according to a first embodiment of the present invention.
Figure 2:
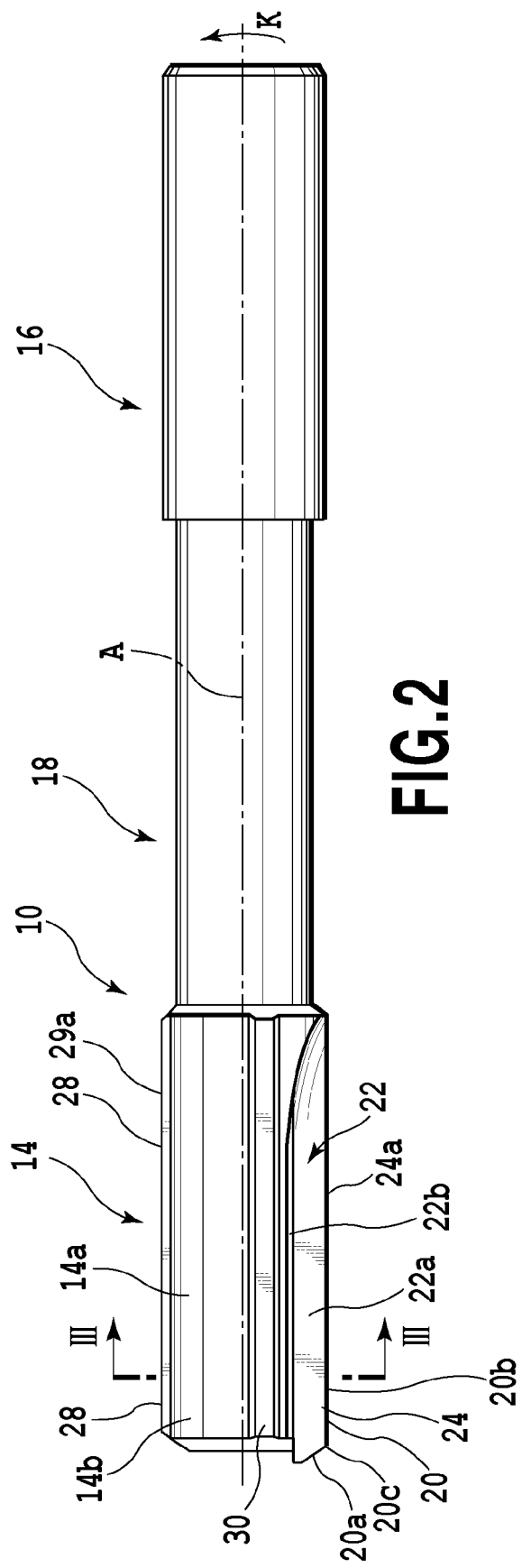
FIG. 2 is a side view of the reamer according to the first embodiment of the present invention.
Figure 3:
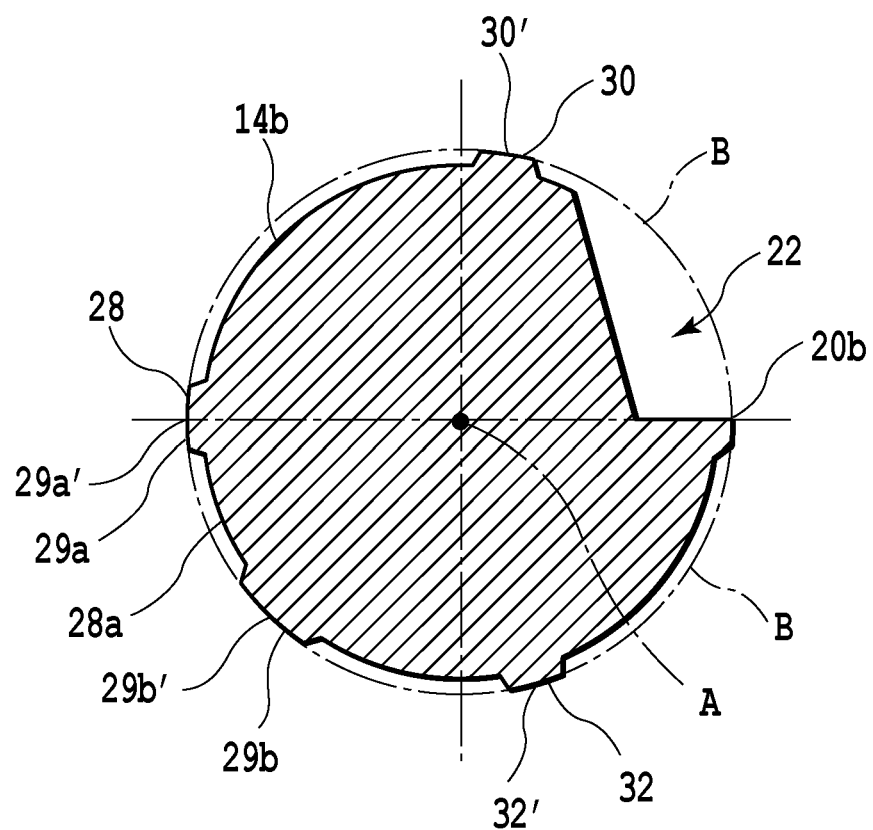
FIG. 3 is a cross-sectional view, taken along line III-III in FIG. 2, of only the cutting part of the reamer in FIG. 2.
Figure 4:
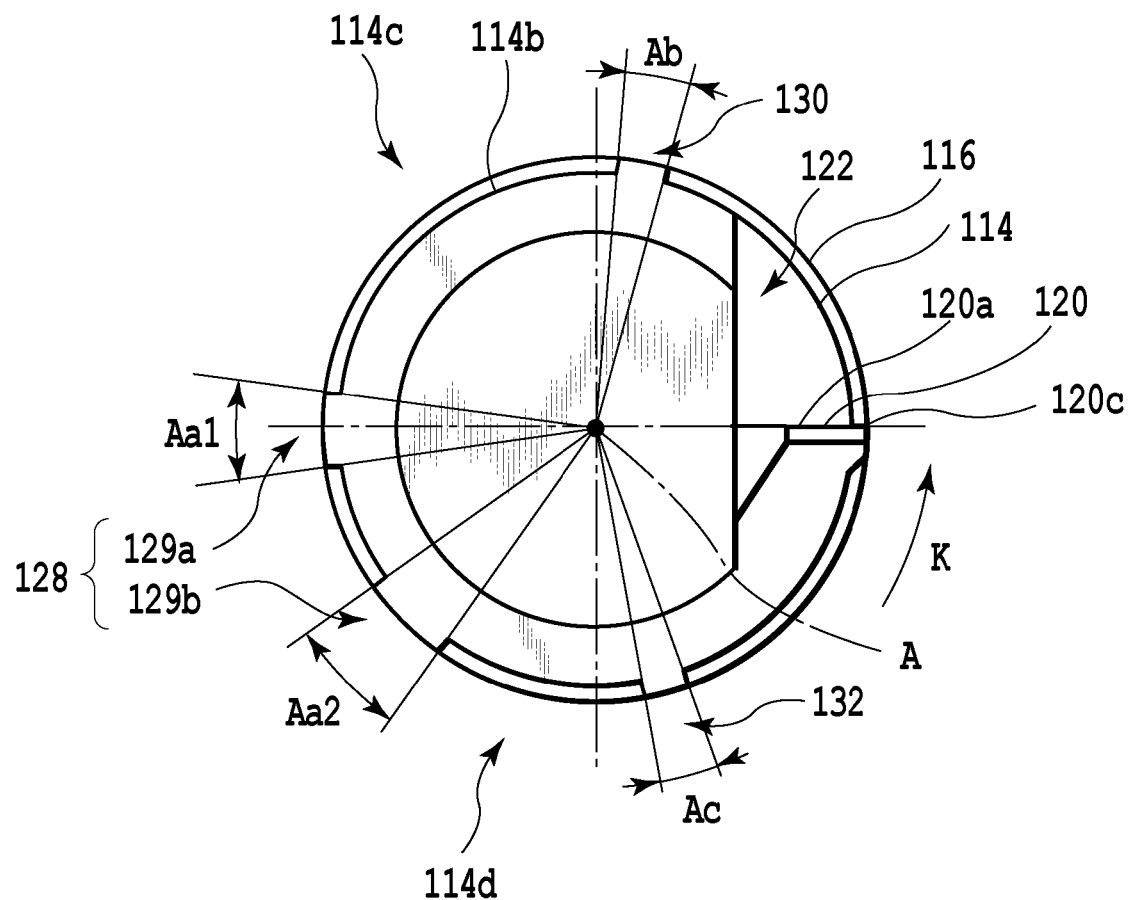
FIG. 4 is a front view of a reamer according to a second embodiment of the present invention.
Figure 5:
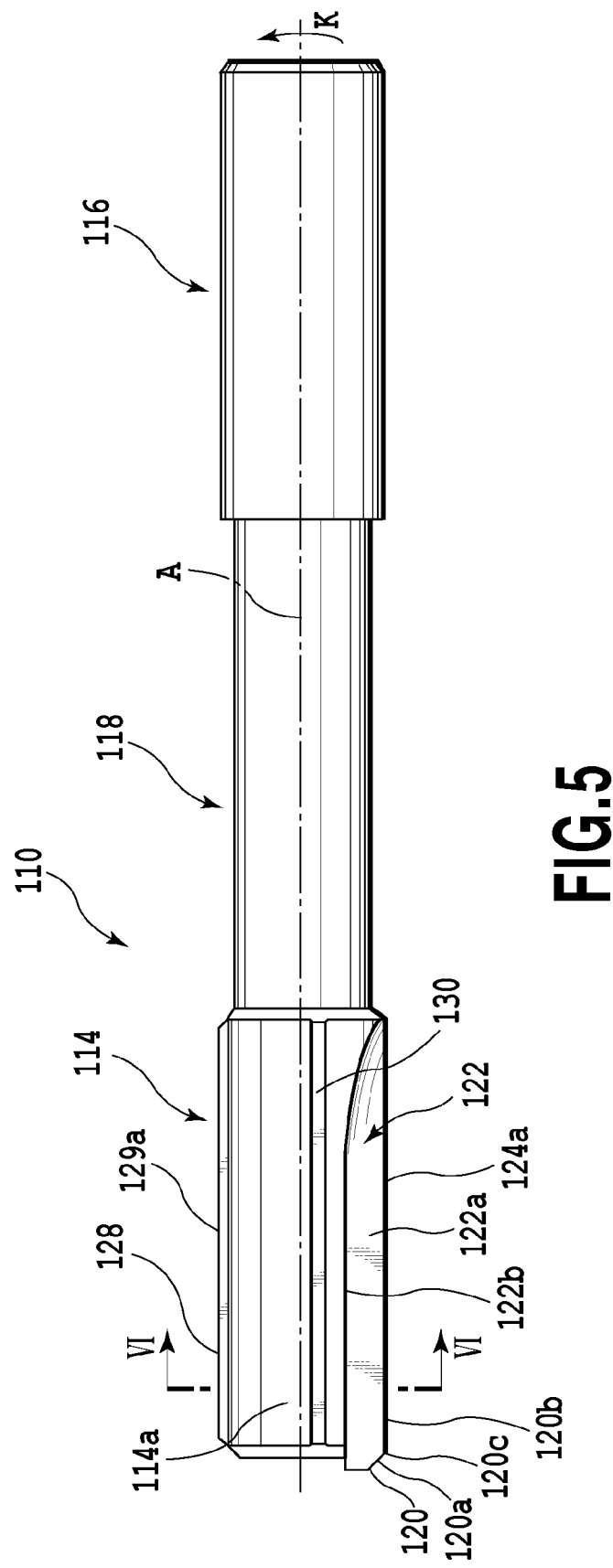
FIG. 5 is a side view of the reamer according to the second embodiment of the present invention.
Figure 6:
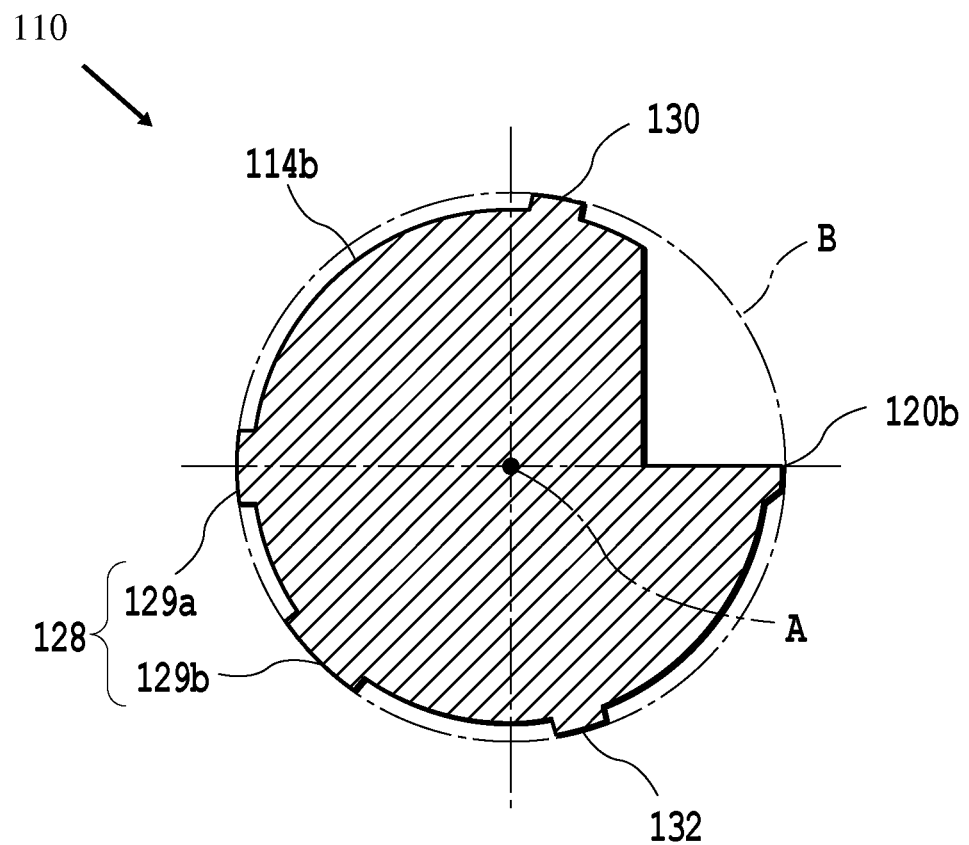
FIG. 6 is a cross-sectional view, taken along line VI-VI in FIG. 5, of only the cutting part of the reamer in FIG. 5.
Figure 7:
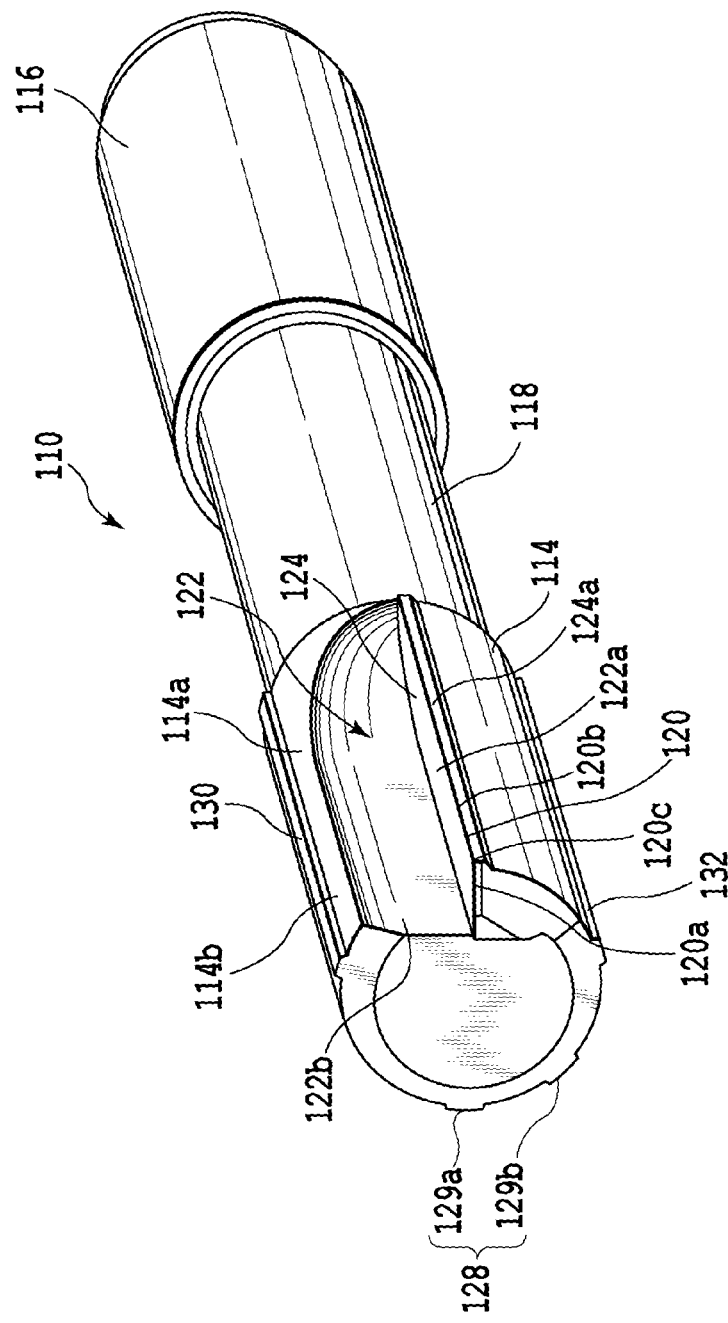
FIG. 7 is a perspective view of the reamer according to the second embodiment of the present invention.
Figure 8:
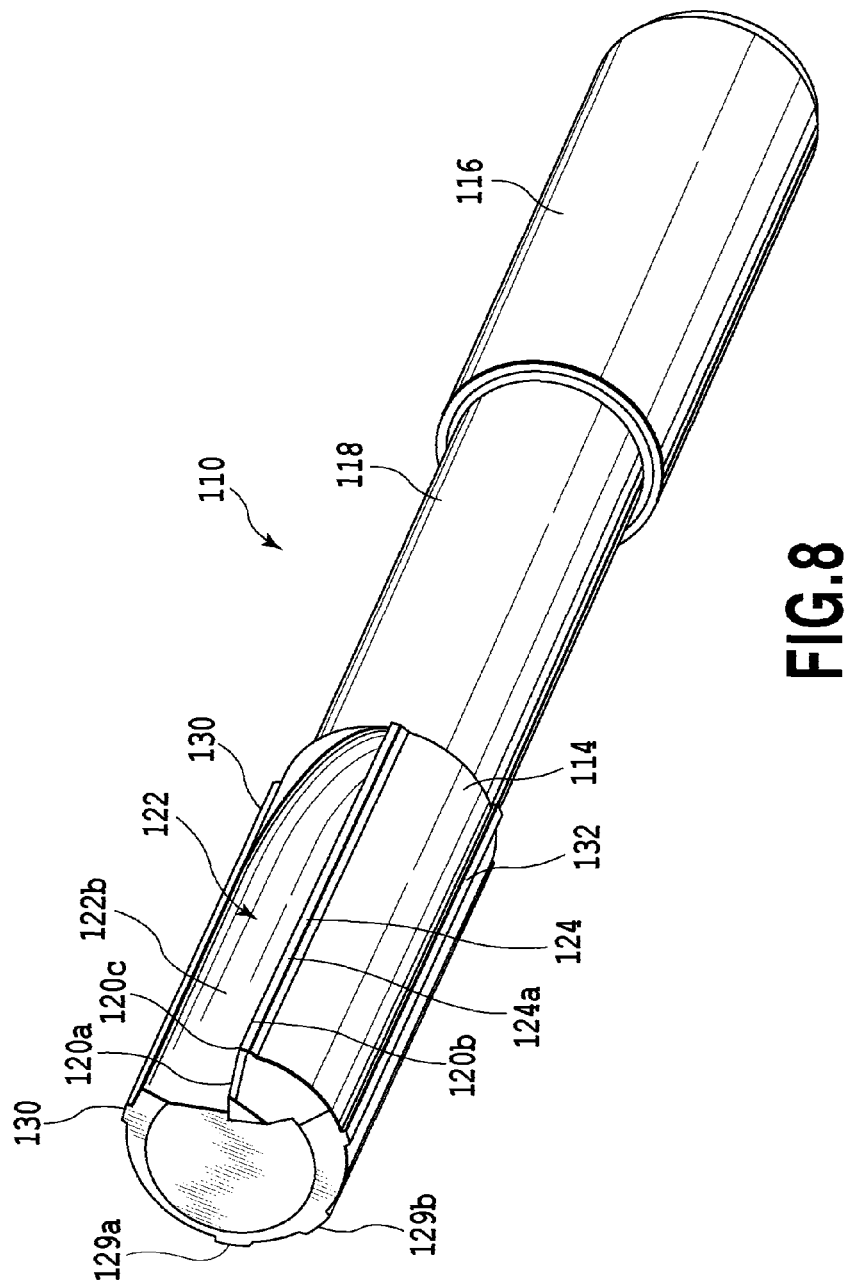
FIG. 8 is another perspective view of the reamer according to the second embodiment of the present invention.

A reamer 10 according to the first embodiment is shown in FIGS. 1 to 3. The reamer 10 is shaped like a rod, and has a center axis A. The center axis A extends so as to pass through the reamer 10 from a leading end side of the reamer 10 to its base end side. Especially in this case, the exterior of the reamer 10 has either an almost cylindrical or an almost rod shape. The center axis A of the reamer 10 can be employed as a rotational axis for the reamer 10 during a cutting operation.

The reamer 10 includes a cutting part 14 provided at the leading end portion, a shank part 16 provided at the rear end portion and a neck part 18 provided between the cutting part 14 and the shank part 16. The cutting part 14, the neck part 18 and the shank part 16 are positioned in order along the reamer 10 from the leading end side. The neck part 18 is slightly narrower than the cutting part 14 and the shank part 16.

The reamer 10 has a single cutting edge 20 in the cutting part 14. This type of reamer is called a single-edge reamer. Further, a recessed portion or flute 22 is formed in the cutting part 14. The flute 22 is formed along the cutting edge 20. Specifically, the flute 22 is formed along the cutting edge 20, so that when a direction in which, during cutting operation, the reamer 10 is to be relatively rotated about the center axis A relative to a workpiece is defined as a rotational direction K, the flute 22 forms a space in front of the cutting edge 20 in the rotational direction K. Furthermore, the flute 22 is formed so as to extend from the leading end side to the base end side of the cutting part 14, substantially parallel to the center axis A of the reamer 10. The flute 22 is shaped so as to facilitate the flow of chips generated during cutting processing using the reamer 10. Therefore, the flute 22 can serve as a chip discharge groove. In this case, an angle formed between a first wall face 22a and a second wall face 22b that define the flute 22 is an obtuse angle.

The cutting edge 20 of the reamer 10 consists of a chamfer cutting edge 20a that is a major cutting edge, a peripheral cutting edge 20b that is a minor cutting edge, and a corner 20c. The chamfer cutting edge 20a is connected to the peripheral cutting edge 20b via the corner 20c. That is, the chamfer cutting edge 20a, the peripheral cutting edge 20b and the edge of the corner 20c are connected together to form a single cutting edge 20.

The cutting edge 20 having the chamfer cutting edge 20a, the peripheral cutting edge 20b and the corner 20c can be employed to cut the inner wall of a prepared hole that is previously worked and formed. The reamer 10 is configured especially so as to be suitable for the finishing process. A peripheral face 24a extending from the peripheral cutting edge 20b is on a wall portion 24 having the first wall face 22a, and since the peripheral face 24a is not provided with a nonzero relief angle, it serves as a cylindrical margin that contacts the inner face of a machined hole. When the peripheral face 24a extending from the peripheral cutting edge 20b is provided with a nonzero relief angle, it can function as a peripheral relief face that does not contact the inner face of a machined hole.

Further, the cutting part 14 comprises three guide pads 28, 30 and 32. These three guide pads 28, 30 and 32 are arranged, at a distance from each other, in the area of the cutting part 14 except the wall portion 24 and the flute 22. The three guide pads 28, 30 and 32 are portions that contact a workpiece in a radial direction, and the part of the cutting part 14, other than the guide pads and the cutting edge, is provided to have a clearance inwardly, in the radial direction.

Each of the three guide pads 28, 30 and 32 continuously extends between the leading end portion and the base end portion of the cutting part 14 so as to extend in the direction substantially parallel to the center axis A.

Each guide pad includes a peripheral face that extends in the circumferential direction and radial faces that extend in a direction from the peripheral face to the inside of the cutting part 14. The peripheral face and the radial faces of each of the guide pads are included in a peripheral face 14a of the cutting part 14. The radial faces of each of the guide pads extend obliquely toward a face 14b of the peripheral face 14a.

The shape of each of the guide pads 28, 30 and 32 is designed such that the peripheral face of each of these guide pads 28, 30 and 32 extend on an imaginary cylindrical face B that is defined as passing the corner 20c about the center axis A (see FIGS. 1 and 3). Therefore, the peripheral faces of the three guide pads, first to third guide pads 28, 30 and 32, have curved shapes (arc shapes) that are almost aligned with the cylindrical face B. It should be noted that the center axis of a cylinder that has the cylindrical face B on the surface matches the center axis A. In this case, each of the three guide pads is designed so that the width of the guide pad is substantially unchanged from the leading end side to the base end side in the direction of the center axis A.

Of the three guide pads, the first guide pad 28 is formed so as to project to the side that is almost opposite the cutting edge 20. The second guide pad 30 is positioned in one area (a first area) 14c of the two areas, of the peripheral face 14a of the cutting part 14, that are located between the first guide pad 28 and the single cutting edge 20, and that are directed toward sides opposite each other. Whereas the third guide pad 32 is positioned in the other area (a second area) 14d other than the area 14c, of the two areas that are directed toward sides opposite each other. Since the first area 14c and the second area 14d are facing in opposite directions from each other, the second guide pad 30 and the third guide pad 32 are arranged substantially on sides opposite each other. Furthermore, when the positional relationship between the second guide pad 30 and the third guide pad 32 is to be explained by employing a direction in which the reamer 10 relatively rotates to a workpiece during a cutting operation, i.e., in the rotational direction K, the second guide pad 30 is positioned to the front, in the rotational direction K, by employing the cutting edge 20 as a reference, and the third guide pad 32 is positioned to the rear in the rotational direction K.

In this case, when the reamer 10 is viewed from the leading end portion in the direction of the center axis A, as shown in FIG. 1, the first guide pad 28 is provided in an area that includes a position symmetrical to the corner 20c about the center axis A. Therefore, when a plane that extends to include the center axis A and to pass the corner 20c is defined as a first plane S1, the first plane S1 intersects the first guide pad 28 (see FIGS. 1 and 3). For the reamer 10 of the first embodiment, the first guide pad 28 includes a recessed portion 28a extend toward the center axis A, so that two guide pad portions are formed at a distance from each other in the circumferential direction of the reamer 10 (the tangential direction). That is, the first guide pad 28 in this case represents a portion that includes two guide pad portions and the recessed portion 28a.

The circumferential position of the first guide pad 28 can be specified by employing the location of the circumferential midpoint of the peripheral face 28b of the first guide pad 28. More specifically, the circumferential position of the first guide pad 28 can be specified by employing the location of the circumferential midpoint of the peripheral face 28b of the first guide pad 28 on a plane (hereinafter referred to as an orthogonal plane) that is defined as being orthogonal to the center axis A for the cutting part 14. It should be noted that FIG. 3 is a cross-sectional view, taken along one of the orthogonal planes, of the cutting part 14 of the reamer 10.

When a half-plane whose range is determined by the center axis A and that passes the corner 20c is defined as a reference half-plane fs, the circumferential midpoint, on the orthogonal plane, of the peripheral face 28b of the first guide pad 28 is located to the front in the rotational direction K by employing the reference half-plane fs as the origin. Further, the first guide pad 28 is designed so that the circumferential midpoint on the orthogonal plane, of the peripheral face 28b of the first guide pad 28, is located between a half-plane that has a range determined by the center axis A and that forms an angle of 180° relative to the reference half-plane fs, and a half-plane that has a range determined by the center axis A and that forms an angle of 230° relative to the reference half-plane fs.

In other words, according to the design of the first guide pad 28, relative to the reference half-plane an angle of 180° or greater, up to 230° or smaller, is formed to the front, in the rotational direction K, by employing the reference half-plane fs as the origin or as a reference, by the half-plane that has a range determined by the center axis A and that is defined as passing the circumferential midpoint of the peripheral face of the first guide pad 28.

According to the reamer 10 of the first embodiment, as for the two guide pad portions 29a and 29b included in the first guide pad 28, a circumferential midpoint 29a' on the orthogonal plane for the peripheral face of one guide pad portion 29a, which is located to the rear, in the rotational direction K, is positioned on a half-plane f1 that has a range determined by the center axis A and that forms an angle Pa1 of 180°, relative to the reference half-plane fs, to the front in the rotational direction K by employing the reference half-plane fs as the origin. In other words, relative to the reference half-plane fs, the half-plane f1 that passes the midpoint 29a' of the peripheral face of the one guide pad portion 29a forms an angle of 180° to the front, in the rotational direction K, by employing the reference half-plane fs as the origin. Whereas a midpoint 29b' on the orthogonal plane for the peripheral face of the other guide pad portion 29b, which is located to the front in the rotational direction K, is positioned on a half-plane f2 that has a range determined by the center axis A and that forms an angle Pa2 of 220°, relative to the reference half-plane fs, to the front in the rotational direction K, by employing the reference half-plane fs as the origin. In other words, relative to the reference half-plane fs, the half-plane f2 that passes the midpoint 29b' of the peripheral face of the other guide pad portion 29b forms an angle of 220° to the front, in the rotational direction K, by employing the reference half-plane fs as the origin.

Further, when a circumferential length Aa1 on the orthogonal plane of the peripheral face of the guide pad portion 29a, and a circumferential length Aa2 on the orthogonal plane of the peripheral face of the guide pad portion 29b are added together, the obtained sum is greater than the circumferential length of the peripheral face of the second guide pad 30, which will be described later, and is also greater than the circumferential length of the peripheral face of the third guide pad 32. This indicates that the peripheral face of the first guide pad 28 is broader than the peripheral face of the second guide pad 30, and is also broader than the peripheral face of the third guide pad 32.

The circumferential length, on the orthogonal plane, of the peripheral face of the first guide pad 28 is defined as the sum of the circumferential length Aa1, of the guide pad portion 29a, and the circumferential length Aa2, of the guide pad portion 29b, and is preferably set so within a range of 8% to 15% of the circumferential length of the cylindrical face B. And for the reamer 10 of the first embodiment, the circumferential length is also so set within this range.

The second guide pad 30 will now be described. The circumferential location of the second guide pad 30 can also be specified by employing the position of the circumferential midpoint of the peripheral face 30b of the second guide pad 30. The circumferential midpoint on the orthogonal plane, of the peripheral face 30b of the second guide pad 30, is located to the front in the rotational direction K by employing the reference half-plane fs as the origin. Further, the second guide pad 30 is arranged so that the midpoint of the second guide pad 30 is also positioned between the flute 22 and the first guide pad 28. Specifically, the second guide pad 30 is designed so that a half-plane that has a range determined by the center axis A and that is defined as passing the circumferential midpoint of the peripheral face of the second guide pad 30 forms, relative to the reference half-plane fs, an angle of 70° or greater, up to 130°, or smaller, to the front in the rotational direction K by employing the reference half-plane fs as the origin. For the reamer 10 of the first embodiment, a midpoint 30' on the orthogonal plane, of the peripheral face of the second guide pad 30, is located on a half-plane f3, which has a range determined by the center axis A and which forms an angle of 80°, relative to the reference half-plane fs, to the front in the rotational direction K by employing the reference half-plane fs as the origin. That is, the half-plane f3 that passes the midpoint 30' of the peripheral face of the second guide pad 30 forms an angle Pb of 80° relative to the reference half-plane fs.

It is desirable that a circumferential length Ab on the orthogonal plane, of the peripheral face of the second guide pad 30 be set so within a range of 0.8% to 6% of the circumferential length of the cylindrical face B, and actually, in this embodiment, the circumferential length Ab is set so within this range. When a plane that includes the center axis A and extends orthogonal to the first plane S1 is defined as a second plane S2, the second guide pad 30 of the reamer 10 does not intersect the second plane S2.

The third guide pad 32 will now be described. The circumferential position of the third guide pad 32 can also be specified by employing the position of the circumferential midpoint of the peripheral face 32b of the third guide pad 32. A circumferential midpoint 32' on the orthogonal plane, of the peripheral face 32b of the third guide pad 32, is located to the front in the rotational direction K by employing the reference half-plane as the origin. Further, the third guide pad 32 is designed so that a half-plane that has a range determined by the center axis A and that is defined by passing the circumferential midpoint of the peripheral face of the third guide pad 32 forms, relative to the reference half-plane fs, an angle of 225° or greater, up to 330°, or smaller, to the front in the rotational direction K by employing the reference half-plane fs as the origin. For the reamer 10 of the first embodiment, the midpoint 32' on the orthogonal plane, of the peripheral face of the third guide pad 32, is located on a half-plane f4, which has a range determined by the center axis A and which forms an angle of 285°, relative to the reference half-plane fs, to the front in the rotational direction K by employing the reference half-plane fs as the origin. In other words, the half-plane f4 that passes the midpoint 32' of the peripheral face of the third guide pad 32 forms an angle Pc of 285°, relative to the reference half-plane.

It is also desirable that a circumferential length Ac on the orthogonal plane, of the peripheral face of the third guide pad 32, be set so within a range of 0.8% to 6% of the circumferential length of the cylindrical face B, and actually, in this embodiment, the circumferential length Ac is set so within this range. It should be noted that the third guide pad 32 of the reamer 10 does not intersect the second plane S2.

During the reaming process, basically, the above described reamer 10 is rotated about the center axis A, and pushed and driven in a workpiece. Especially, the reamer 10 is driven, along the center axis A, in a rough hole that was previously drilled in a workpiece, and performs finishing for the rough hole in order to obtain a predetermined inner diameter.

The operation of the reamer 10 of the first embodiment having the above described structure, and the obtained effects will now be described.

During the cutting operation, the reamer 10 having the above described structure is appropriately supported in a hole, as will be specifically described in detail. As a result, the reamer 10 can improve the accuracy of machining of the hole.

For the reamer 10, the first guide pad 28 is formed so as to project to the side almost opposite the cutting edge 20. Especially, the first guide pad 28 intersects the first plane S1 that includes the center axis A and that extends so as to pass the corner 20c. Therefore, the first guide pad 28 can support (guide) the reamer against the cutting resistance that is encountered by the cutting edge during the cutting operation, and especially against the thrust force that is exerted in the normal direction traveled by the cutting edge 20. Since the first guide pad 28 works to support the reamer 10 to counter the thrust force, which represents a large ratio of the cutting resistance generated during cutting, the reamer 10 can effectively improve the straightness and roundness of the machined hole. Furthermore, since the circumferential length of the peripheral face of the first guide pad 28 is set so within a range of 8% to 15% of the circumferential length of the cylindrical face that is defined as passing the corner 20c about the center axis A, the area where the first guide pad 28 contacts the inner face of the machined hole is satisfactory. As a result, too great an increase in the sliding resistance (burnishing torque) of the first guide pad 28 can be prevented, and pushing of the hole outward by the first guide pad 28 can be suppressed. This indicates that a reduction in the inner diameter of the machined hole, i.e., the inner diameter of the machined hole becoming smaller than is desired, can be suppressed. Therefore, when the processing using the reamer 10 is performed, an accurately finished hole can be obtained.

Since the second guide pad 30 and the third guide pad 32 are provided in the above described manner, these pads can support the reamer 10 against the resultant force of the principal cutting force, exerted in the tangential direction of the cutting edge 20, and the centrifugal force applied to the reamer 10. As a result, the straightness and the roundness of a machined hole can be more appropriately improved. Further, each of the circumferential lengths Ab and Ac of the peripheral faces of the second and third guide pads 30 and 32 are set so within a range of 0.8% to 6% of the circumferential length of the cylindrical face B, and are shorter than the circumferential length Aa of the first guide pad 28. Therefore, the increase in the sliding resistance resulting from formation of these second and third guide pads 30 and 32 is suppressed very slightly. Therefore, a reduction in the inner diameter of the machined hole can be appropriately suppressed. As a result, the roundness of the hole can be improved.

Generally, in a case wherein the reaming process is performed for finishing a workpiece for which elastic deformation tends to occur, such as a workpiece that has a portion having an uneven thickness or a thin wall portion, or a workpiece made of an aluminum alloy, elastic deformation occurs so that the inner face of a rough hole or of a machined hole may be pushed and expanded outward, in the radial direction, and the peripheral faces of the guide pads and the inner face closely contact each other. However, since the reamer 10 of this embodiment includes the first guide pad 28, the circumferential length of which is set within the above described predetermined range, and the second and third guide pads 30 and 32, the circumferential lengths of which are set so shorter than that of the first guide pad, too great an increase in the sliding resistance of the guide pads 28, 30 and 32 can be prevented. Therefore, as described above, in processing using the reamer 10, a reduction in the inner diameter of the machined hole can be suppressed.

Furthermore, since the first, second and third guide pads 28, 30 and 32 are located in the predetermined area, as described above, the reamer 10 can be appropriately supported against the cutting resistance, the centrifugal force and the resultant force of the two, during the cutting operation.

Therefore, the reamer 10 can effectively improve the straightness and the roundness of the machined hole.

On the other hand, in a process for cutting a workpiece for which elastic deformation easily occurs, the peripheral faces of the guide pads closely contact the inner face of the hole, and there is a case wherein the guide pads may enter the inner faces of the hole, and cut the workpiece. For a reamer wherein guide pads are simply arranged at three locations, there is a tendency for these guide pads to function as cutting edges, and it is easy to produce a triangular or pentagonal hole, as in a case wherein cutting is performed using a reamer having four cutting edges (a four-edge reamer).

On the contrary, for the reamer 10 of this embodiment, the second guide pad 30 is formed so as not to be arranged on the second plane, and the third guide pad 5c is also formed so as not to be arranged on the second plane, so that formation of a triangular or a pentagonal hole can be prevented. In other words, since the cutting edge and the first to the third guide pads, adjacent to each other in the rotational direction, are not located at intervals of 90°, formation of a triangular or a pentagonal hole can be prevented.

As described above, when the reamer 10 is viewed from the leading end side along the center axis A, the second and third guide pads 30 and 32 are not located uniformly in the circumferential direction by employing the corner 20c as a reference, so that the use of the reamer 10 can prevent formation of a hole, especially, the outlet side of a hole, having a polygonal shape such as a triangular or pentagonal shape.

A reamer 110, according to a second embodiment of the present invention, will now be described. It should be noted, however, that mainly, a difference between the reamer 110 and the reamer 10 of the first embodiment will be described below. Reference numerals corresponding to the reference numerals as employed for previously described components are also employed to denote corresponding components, and no further explanation for them will be given.

The reamer 110 is shown in FIGS. 4 to 8. For the reamer 110, a flute 122 that corresponds to the flute 22 is formed along a cutting edge 120 that corresponds to the cutting edge 20. The flute 122 is defined by a wall face 122a and a wall face 122b, which together, almost form a right angle. As is apparent from this structure, a form of the flute of the reamer of this invention may be changed into various forms.

The reamer 110, as well as the reamer 10, includes three guide pads 128, 130 and 132. These three guide pads 128, 130 and 132 correspond to the three guide pads 28, 30 and 32 described above, and the locations, the sizes and the ranges of these guide pads 128, 130 and 132 are substantially the same as those for the three guide pads 28, 30 and 32. However, each of the three guide pads 128, 130 and 132 has different features from the corresponding pad of the guide pads 28, 30 and 32. The faces of each of the three guide pads 128, 130 and 132, in the radial direction, are formed so as to provide a right angle relative to a peripheral face 114b of a cutting part 114.

A reamer 210 according to a third embodiment of the present invention will now be described. It should be noted, however, that mainly, a difference between the reamer 210 and the reamers 10, 110 of the first and second embodiments will be described below. Reference numerals corresponding to the reference numerals as employed for previously described components are also employed to denote corresponding components, and no further explanation for them will be given.

Figure 9:
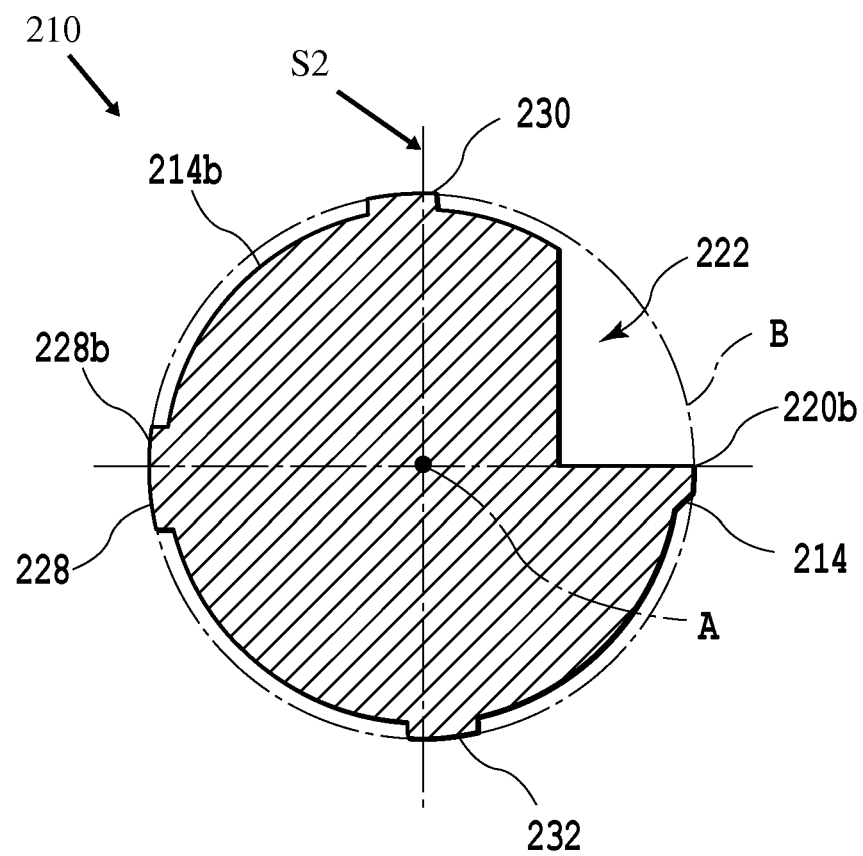
FIG. 9 is a cross-sectional view of the cutting part of a reamer according to a third embodiment of the present invention, that corresponds either to FIG. 3 or 6.

The reamer 210 will be described based on FIG. 9. Three guide pads 228, 230 and 232 are formed on the cutting part 214 of the reamer 210. Of the three guide pads, a first guide pad 228, which is different from that for the first guide pads 28 and 128, has no recessed portion and has a peripheral face 228b in which no steps are substantially present in a circumferential direction. As in this structure, the first guide pad 228 may be formed of only a single guide pad portion, instead of a plurality of guide pad portions.

It is preferable also for the third embodiment that the circumferential length of the first guide pad 228 be within a range of 8% to 15% of the circumferential length of a cylindrical face B.

Further, a second guide pad 230 of the reamer 210 is formed so that a second plane S2 intersects the second guide pad 230. For the second guide pad 230 thus arranged, the circumferential length of the peripheral face of the second guide pad 230 is also set within a range of 0.8% to 6% of the circumferential length of the cylindrical face B.

Furthermore, a third guide pad 232 of the reamer 210 is formed so that the second plane S2 intersects the third guide pad 232. Likewise, for the third guide pad 232 thus arranged, the circumferential length of the peripheral face of the third guide pad 232 is set within a range of 0.8% to 6% of the circumferential length of the cylindrical face B.

A reamer 310 according to a fourth embodiment of the present invention will now be described. It should be noted, however, that mainly, a difference between the reamer 310 and the reamer 210 of the third embodiment will be described below. Reference numerals corresponding to the reference numerals as employed for previously described components are also employed to denote corresponding components, and no further explanation for them will be given.

Figure 10:
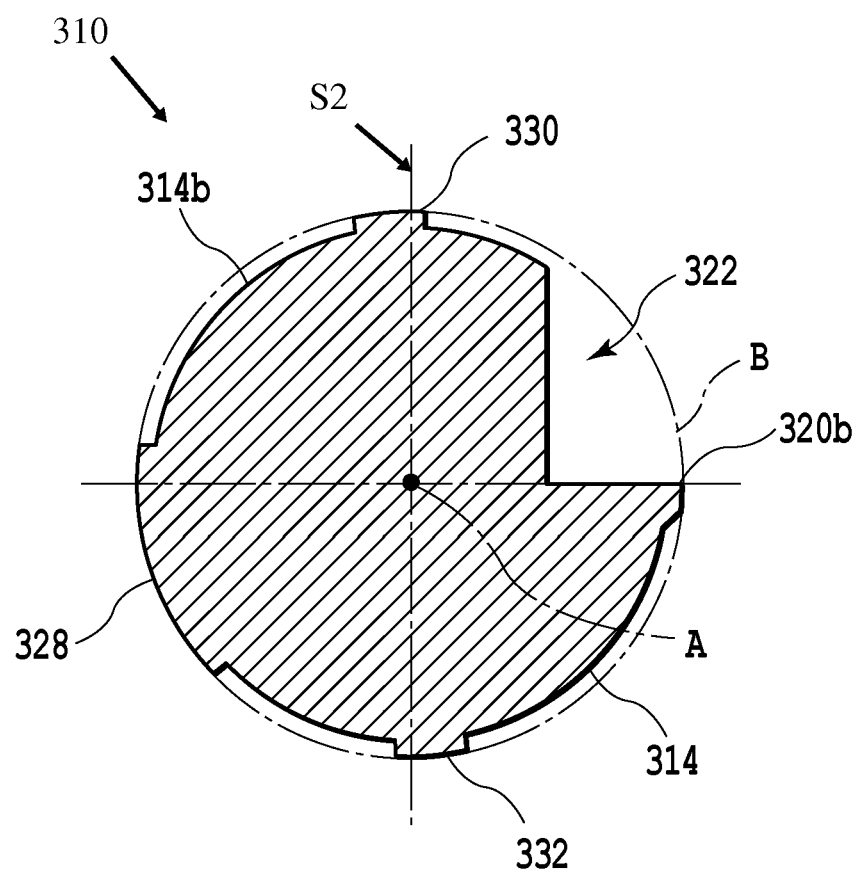
FIG. 10 is a cross-sectional view of the cutting part of a reamer according to a fourth embodiment of the present invention, that corresponds either to FIG. 3 or 6.

The reamer 310 will be described based on FIG. 10. The reamer 310 differs from the reamer 210 mainly in the size of the first guide pad. The circumferential length of the peripheral face of a first guide pad 328 is set to about 15% of the circumferential length of a cylindrical face B.

A reamer 410 according to a fifth embodiment of the present invention will now be described. Reference numerals corresponding to the reference numerals as employed for previously described components are also employed to denote corresponding components, and no further explanation for them will be given.

Figure 11:
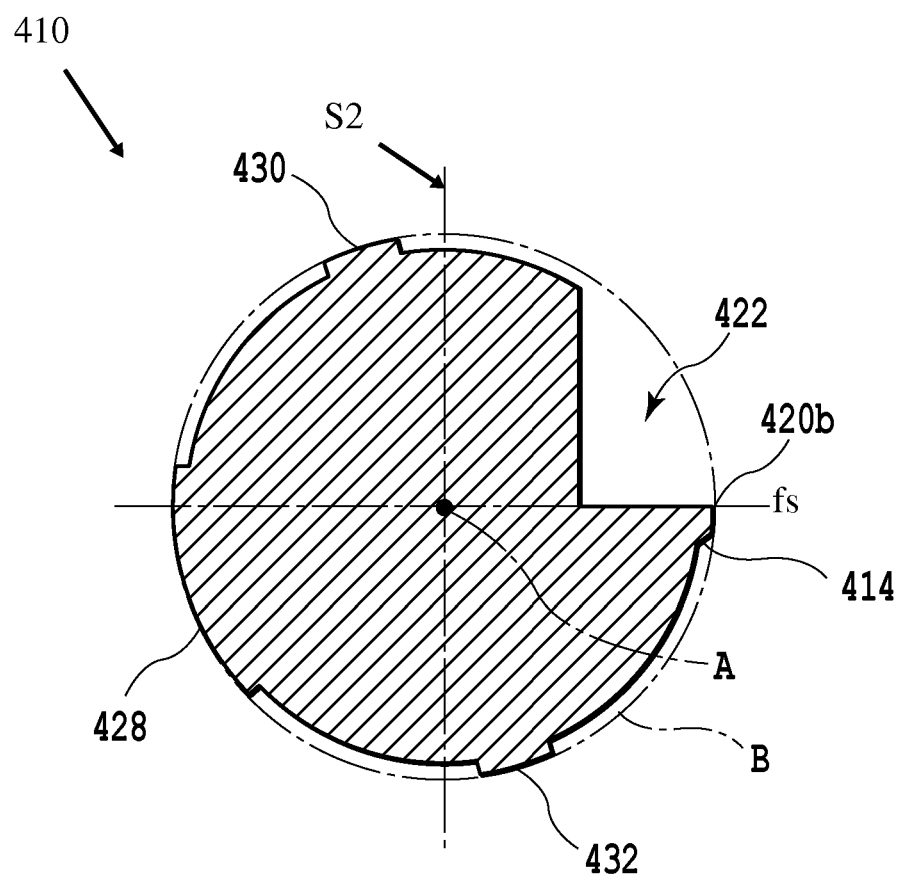
FIG. 11 is a cross-sectional view of the cutting part of a reamer according to a fifth embodiment of the present invention, that corresponds either to FIG. 3 or 6.

The reamer 410 will be described based on FIG. 11. The size, the shape and the position of a first guide pad 428 of the reamer 410 are almost the same as those of the first guide pad 328 of the reamer 310.

The sizes and the shapes of a second guide pad 430 and a third guide pad 432 of the reamer 410 are also substantially the same as those of the second guide pad 330 and the third guide pad 332 of the reamer 310. Further, the position of the third guide pad 432 is the same as the position of the third guide pad 32 of the reamer 10.

The reamer 410 differs from the reamers of the other previous embodiments in the position of the second guide pad 430. The second guide pad 430 of the reamer 410 is arranged so as not to intersect a second plane S2. Furthermore, for the reamer 410, the midpoint of the peripheral face of the second guide pad 430 is located on a half-plane that forms an angle greater than 90° relative to a reference half-plane fs, i.e., forms an obtuse angle.

Various experiments were conducted in order to investigate effects in a reamer according to the present invention that have been described based on the embodiments. An example experiment will now be described. In the experiment described below, reamers that embody the present invention (hereinafter referred to as invention reamers) were employed to perform hole machining, and a conventional comparison reamer (hereinafter referred to as a comparison reamer) was also employed to perform hole machining. Then, the machining toques and the accuracy of the machined holes were compared to evaluate the performance of the invention reamers. Results that prove the superiority of the invention reamers were obtained, as will be described below.

First, the structures of the invention reamers employed for the experiment will be described. Various types of the invention reamers were employed for the experiments, and, for example, two following invention reamers were employed. Firstly, a first invention reamer will be described. In the first invention reamer, a diameter of the reamer at the corner was set as 5.5 mm. For the first invention reamer, as well as the reamer 10 of the first embodiment and the reamer 110 of the second embodiment, the first guide pad was formed of two guide pad portions located at a distance from each other.

The circumferential midpoint of the peripheral face of one of the guide pad portions of the first guide pad was positioned on a half-plane that has a range defined by the center axis A and forms an angle of 180° relative to a reference half-plane. In other words, one of the guide pad portions of the first guide pad of the first invention reamer was arranged to intersect the first plane. The circumferential midpoint of the other guide pad portion of the first guide pad was positioned to the front, in the rotational direction by employing the reference half-plane as the origin, on a half-plane that has a range defined by the center axis A and that forms an angle of 220° relative to the reference half-plane.

Further, the circumferential midpoint of the peripheral face of the second guide pad of the first invention reamer was positioned to the front, in the rotational direction by employing the reference half-plane as the origin, on a half-plane that has a range defined by the center axis A and that forms an angle of 80° relative to the reference half-plane. Further, the circumferential midpoint of the peripheral face of the third guide pad of the first invention reamer was positioned to the front, in the rotational direction by employing the reference half-plane as the origin, on a half-plane that has a range defined by the center axis A and that forms an angle of 285° relative to the reference half-plane.

Furthermore, when the circumferential length of the peripheral face of one of the guide pad portions of the first guide pad and the circumferential length of the peripheral face of the other guide pad portion were added together, the obtained sum was set at 15% of the circumferential length of a cylindrical face that is defined as passing the corner about the center axis. The circumferential length of the peripheral face of the second guide pad was set at 6% of the circumferential length of the cylindrical face. Likewise, the circumferential length of the peripheral face of the third guide pad was set at 6% of the circumferential length of the cylindrical face.

On the other hand, the second invention reamer is different from the first invention reamer in the circumferential lengths of the peripheral faces of the first to the third guide pads. For the second invention reamer, when the circumferential length of the peripheral face of one of the guide pad portions of the first guide pad and the circumferential length of the peripheral face of the other guide pad portion were added together, the obtained sum was set at 8% of the circumferential length of a cylindrical face that was defined as passing the corner about the center axis. The circumferential length of the peripheral face of the second guide pad was set at 0.8% of the circumferential length of the cylindrical face. Likewise, the circumferential length of the peripheral face of the third guide pad was set at 0.8% of the circumferential length of the cylindrical face.

Figure 12:
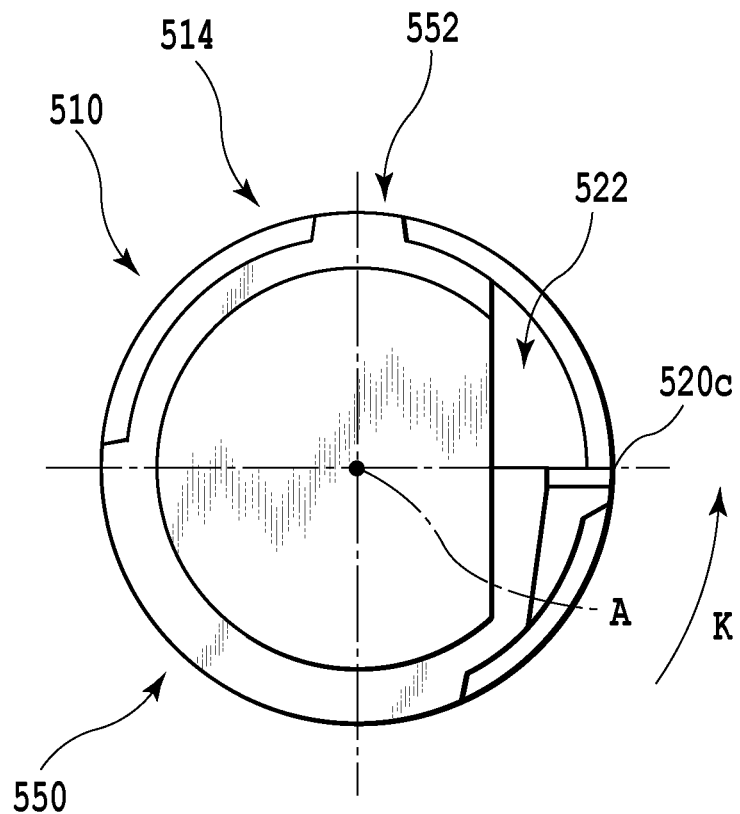
FIG. 12 is a front view of a conventional reamer provided for comparison.
Figure 13:
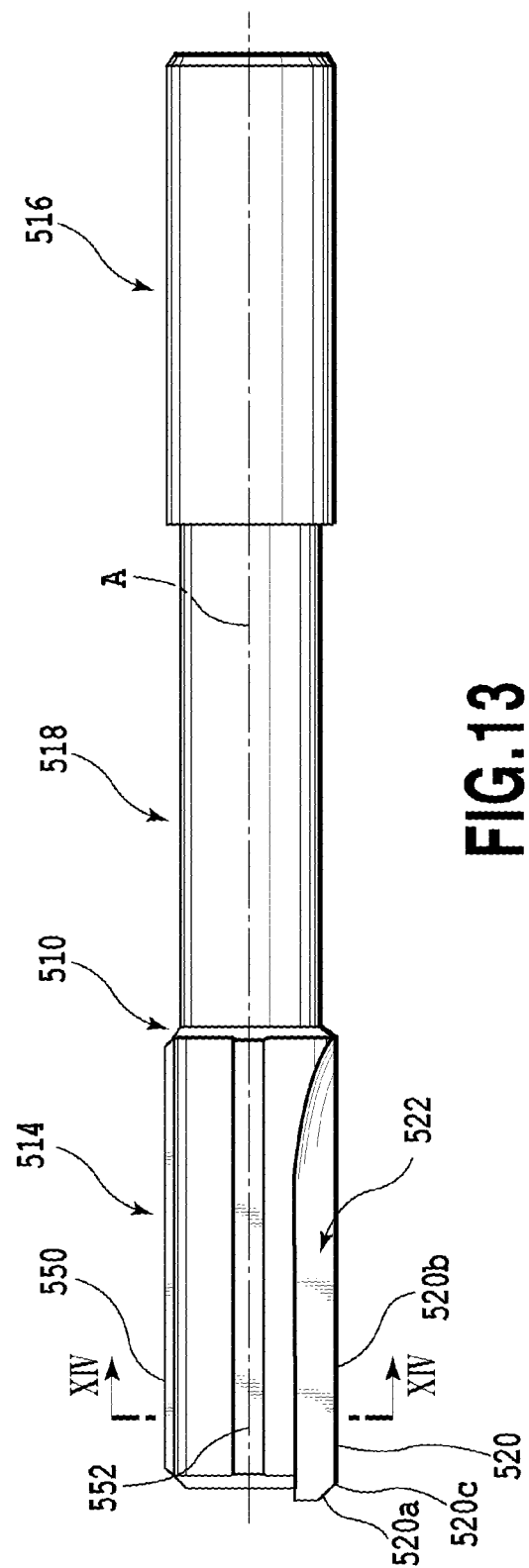
FIG. 13 is a side view of the reamer in FIG. 12.
Figure 14:
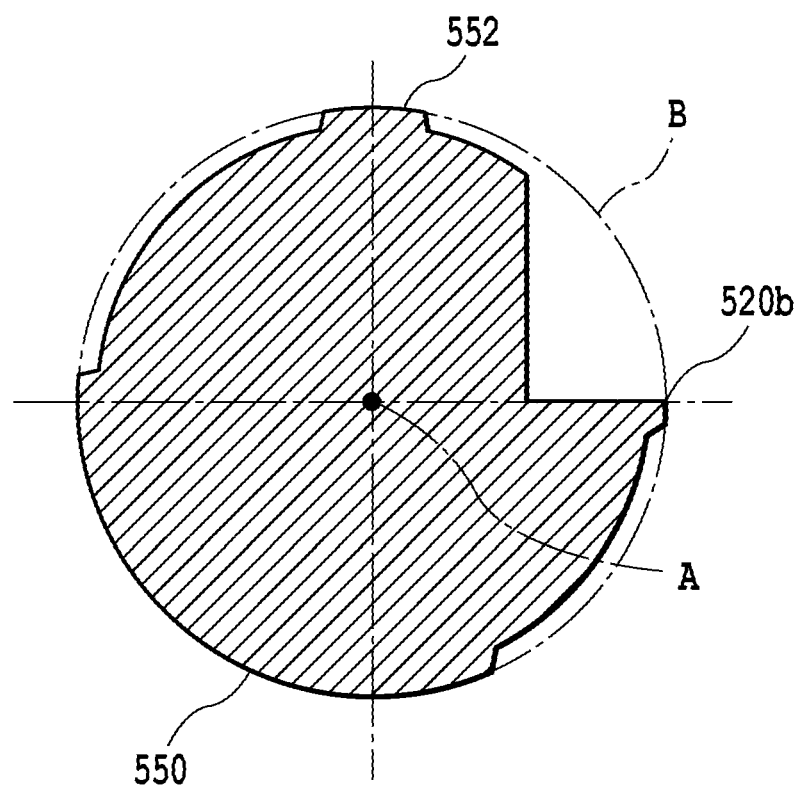
FIG. 14 is a cross-sectional view, taken along line XIV-XIV in FIG. 13, of only the cutting part of the reamer in FIG. 13.

The structure of a conventional reamer 510 used as a comparison will now be described based on FIGS. 12 to 14. The diameter of 5.5 mm for the invention reamer was also set as the diameter of the comparison reamer at a corner 520c. The guide pads of the comparison reamer were formed of two guide pads arranged at a distance in the circumferential direction. A guide pad 550 was positioned to the front, in the rotational direction of the reamer by employing, as the origin, a reference half-plane that has a range defined by a center axis A and that extends so as to pass the corner 520c of a cutting edge 520. Further, the guide pad 550 was arranged so that the pad intersects a plane that is defined as including the center axis A and passing the corner 520c, and covers a large range. The circumferential midpoint of the peripheral face of the guide pad 550 was positioned, to the front in a rotational direction K, by employing the reference half-plane as the origin, on a half-plane that has a range defined by the center axis A and that forms an angle of 230° relative to the reference half-plane.

On the other hand, the circumferential midpoint of the peripheral face of a guide pad 552, arranged to the rear in the rotational direction, was positioned on a half-plane that has a range defined by the center axis A and forms an angle of 90° relative to the reference half-plane.

Furthermore, for the comparison reamer, the circumferential length of the peripheral face of the guide pad 550 was set at about 35% of the circumferential length of a cylindrical face that is defined as passing the corner about the center axis. The circumferential length of the other guide pad 552 of the comparison reamer was set at about 5% of the circumferential length of the cylindrical face.

For the experiment, an aluminum alloy was employed as a workpiece. A cutting speed Vc of 80 m/min, a feed rate f of 0.16 mm/rev and a machining allowance diameter of 0.5 mm were set as cutting conditions. Then, the first invention reamer, the second invention reamer and the comparison reamer having the above described structures, and the like were employed to perform wet cutting using a cutting fluid.
(Torque During a Machining Operation)

The average torque during machining by the comparison reamer was about 44 N·cm. Whereas, the average torque during machining by the first invention reamer was about 32 N·cm, which is lower than the average torque for the comparison reamer. This is because the first invention reamer employs the structure wherein the circumferential lengths of the first, the second and the third guide pads are limited to those described above, so that the sliding resistances caused at the individual guide pads could be reduced, compared with those for the comparison reamer. Furthermore, the average torque during machining by the second invention reamer was about 25 N·cm, which is still lower than the average torque of the first invention reamer.
(Roundness of a Finish Hole)

The roundness (JIS•B0621-1984) of a finish hole is represented by a difference in two geometrical concentric circles in a case wherein a finish hole is sandwiched between the two circles and the distance between the circles becomes the minimum. Therefore, when the difference is small, this means a high roundness for a finish hole. The roundness of the hole machined by the comparison reamer was 0.9 μm. On the other hand, the roundness for the hole machined by each of the first and second invention reamers was 0.2 μm. This indicates that, since the invention reamers not only include the first to the third guide pads, but also employ the above described structure in the circumferential arrangement for these guide pads, the reamers were effectively supported against the cutting resistance and the centrifugal force that was exerted against the reamers.

It should be noted that the roundness for the obtained hole when machining was performed by employing an invention reamer wherein circumferential positions of the first to the third guide pads are positioned at the upper limit in the predetermined range described above was 0.2 μm, and the roundness for the obtained hole when machining was performed by employing an invention reamer wherein positions of the first to the third guide pads are positioned at the lower limit in the same range was 0.2 μm.

Since during machining, the sliding resistance that occurred for the first to the third guide pads of the invention reamers is smaller than the sliding resistance for the comparison reamer, elastic deformation of the workpiece was suppressed. As a result, the movements of the invention reamers could be stabilized during machining, and the degrading of the roundness of the hole could be prevented. For the comparison reamer, since during machining the individual guide pads contact the hole at the same circumferential intervals (intervals at 90°) by employing the reference half-plane as the origin, an unstable polygonal movement occurred for the comparison reamer about the center axis. As a result, the finish hole had a polygonal shape. On the contrary, the invention reamers employ the structure wherein the first to the third guide pads contact a hole, but not at the same circumferential intervals, by employing the corner at a reference, and unstable polygonal movement about the center axis could be suppressed for the invention reamers. This also contributes to the improvement of the roundness of the finish hole.

For the comparison reamer, when the circumferential length of the peripheral face of the guide pad, located to the front in the rotational direction, is reduced to 17% of the circumferential length of the cylindrical face that passes the corner, the sliding resistance of the guide pads can be lowered, and the average torque can be decreased. However, the comparison reamer is not a reamer in which the number of guide pads and the circumferential arrangement thereof are properly reviewed, and does not have a satisfactory function for supporting the reamer using the guide pads. Therefore, compared with the invention reamers, the comparison reamer did not appropriately exhibit the function for suppressing the movement of the reamer. Therefore, when the comparison reamer was employed for machining, a phenomenon occurred whereby the hole was being machined in a polygonal shape was notable, and the roundness of the hole was greatly deteriorated (a polygonal hole).

Three guide pads have been employed for the above described embodiments; however, four or more guide pads may be employed. Further, for the first and second embodiments, the first guide pad includes two guide pad portions, but the individual guide pads may be configured so as to include a plurality of guide pad portions. It is preferable that the first to the third guide pads be located within the above described range. The range for the first guide pad and the range for the third guide pad partially overlap, and these ranges are applied so as not to be contradictory to each other when designing the guide pads. For example, in consonance with the location of the first guide pad, the third guide pad can be arranged at an appropriate position within the above described range.

The present invention has been described, with some extent of concreteness, based on the above described embodiments and their modifications, etc.; however, the present invention is not limited to these. It should be understood that the present invention can be variously altered or modified, without departing from the spirit or the scope of the present invention described in claims of the invention. That is, the present invention includes all of the modifications, the application examples and the equivalents that are included in the idea of the present invention provided by the scope of the claims of the invention.

What is claimed is:

1. A reamer, which has a center axis and includes a single cutting edge, provided for a cutting part that is arranged at a leading end side, comprising:
- exactly four guide pad portions arranged at a distance from each other, and the cutting edge, around the cutting part; wherein
- each of the guide pad portions extends substantially parallel to the center axis;
- of the four guide pad portions, two adjacent guide pad portions define a first guide pad formed so as to project to the side almost opposite that where the single cutting edge is formed;
- a third guide pad portion defines a second guide pad arranged in one area of two areas, along a peripheral face of the cutting part, that are located between the first guide pad and the single cutting edge and that are directed toward sides opposite each other;
- a fourth guide pad portion defines a third guide pad arranged in the other area, different from the one area, of the two areas that are directed toward the sides opposite each other;
- when a direction in which the reamer is to be relatively rotated, about the center axis, relative to a workpiece is defined as a rotational direction, the second guide pad is positioned to the front, in the rotational direction, by employing the cutting edge as a reference, and the third guide pad is positioned to the rear in the rotational direction;
- when the cutting part is viewed from the leading end side along the center axis, a peripheral face of the first guide pad is larger than a peripheral face of the second guide pad, and is also larger than a peripheral face of the third guide pad;
- wherein the peripheral faces of the three guide pads extend along a cylindrical face that is defined as passing through the corner of the cutting edge about the center axis;
- a circumferential length of the peripheral face of the first guide pad is set within a range of 8% to 15% of a circumferential length of the cylindrical face;
- a circumferential length of the peripheral face of the second and third guide pads is each set within a range of 0.8% to 6% of a circumferential length of the cylindrical face; and
- wherein, when a half-plane that has a range determined by the center axis and that passes the corner of the cutting edge is defined as a reference half-plane, relative to the reference half-plane:
  - i) an angle of 180° or greater, up to 230° or smaller, is formed, to the front in the rotational direction, by employing the reference half-plane as the origin, by a half-plane that has a range determined by the center axis and is defined as passing a circumferential midpoint of the peripheral face of the first guide pad,
  - ii) an angle of 70° or greater, up to 130° or smaller, is formed, to the front in the rotational direction, by employing the reference half-plane as the origin, by a half-plane that has a range determined by the center axis and is defined as passing a circumferential midpoint of the peripheral face of the second guide pad, and
  - iii) an angle of 225° or greater, up to 330° or smaller, is formed, to the front in the rotational direction, by employing the reference half-plane as the origin, by a half-plane that has a range determined by the center axis and is defined as passing a circumferential midpoint of the peripheral face of the third guide pad.

2. The reamer according to claim 1, wherein
when a plane that extends so as to include the center axis and pass a corner of the cutting edge is defined as a first plane, the first plane intersects the first guide pad.

3. The reamer according to claim 1, wherein:
when a plane that extends so as to include the center axis and pass the corner of the cutting edge is defined as a first plane, and a plane that extends so as to include the center axis and be orthogonal to the first plane is defined as a second plane, the second plane does not intersect the second guide pad.

4. The reamer according to claim 1, wherein:
when a plane that extends so as to include the center axis and pass the corner of the cutting edge is defined as the first plane, and a plane that extends so as to include the center axis and be orthogonal to the first plane is defined as a second plane, the second plane does not intersect the third guide pad.

5. The reamer according to claim 1, wherein
a flute extending substantially parallel along the center axis is formed along the cutting edge.

6. The reamer according to claim 1, wherein:
the cutting part is provided at the leading end side, a shank part is provided at a rear end side and a neck part is provided between a base end portion of the cutting part and the shank part;
the neck part is narrower than the cutting part; and
each of the three guide pads continuously extends between the leading end side and the base end portion of the cutting part.

7. The reamer according to claim 6, wherein:
each of the three guide pads is integrally formed with the cutting part.

8. A reamer, which has a center axis and includes a single cutting edge, provided for a cutting part that is arranged at a leading end side, comprising:
- exactly four guide pad portions arranged at a distance from each other, and the cutting edge, around the cutting part; wherein
- each of the guide pad portions extends substantially parallel to the center axis;
- of the four guide pad portions, two adjacent guide pad portions define a first guide pad is formed so as to project to the side almost opposite that where the single cutting edge is formed;
- a third guide pad portion defines a second guide pad arranged in one area of two areas, along a peripheral face of the cutting part, that are located between the first guide pad and the single cutting edge and that are directed toward sides opposite each other;
- a fourth guide pad portion defines a third guide pad arranged in the other area, different from the one area, of the two areas that are directed toward the sides opposite each other;
- when a direction in which the reamer is to be relatively rotated, about the center axis, relative to a workpiece is defined as a rotational direction, the second guide pad is positioned to the front, in the rotational direction, by employing the cutting edge as a reference, and the third guide pad is positioned to the rear in the rotational direction;
- when the cutting part is viewed from the leading end side along the center axis, a peripheral face of the first guide pad is larger than a peripheral face of the second guide pad, and is also larger than a peripheral face of the third guide pad;

wherein the peripheral faces of the three guide pads extend along a cylindrical face that is defined as passing through the corner of the cutting edge about the center axis;

a circumferential length of the peripheral face of the first guide pad is set within a range of 8% to 15% of a circumferential length of the cylindrical face; and a circumferential length of the peripheral face of the second and third guide pads is each set within a range of 0.8% to 6% of a circumferential length of the cylindrical face.

\* \* \* \* \*